United States Patent
Srinivasan et al.

(10) Patent No.: US 10,218,724 B2
(45) Date of Patent: Feb. 26, 2019

(54) MONITORING SOCIAL MEDIA FOR BREACH OF ORGANIZATIONAL PRIVACY

(71) Applicant: Adobe Systems Incorporated, San Jose, CA (US)

(72) Inventors: Balaji Vasan Srinivasan, Bangalore (IN); Shriraj Harish Bhardwaj, Ajmer (IN); Priyanja Singh, Allahabad (IN); Ponnurangam Kumaraguru, New Delhi (IN); Akash Verma, New Delhi (IN)

(73) Assignee: Adobe Inc., San Jose, CA (US)

( * ) Notice: Subject to any disclaimer, the term of this patent is extended or adjusted under 35 U.S.C. 154(b) by 251 days.

(21) Appl. No.: 15/015,777

(22) Filed: Feb. 4, 2016

(65) Prior Publication Data

US 2017/0230387 A1 Aug. 10, 2017

(51) Int. Cl.
*H04L 29/06* (2006.01)
*H04L 12/58* (2006.01)
*G06F 17/30* (2006.01)

(52) U.S. Cl.
CPC .... *H04L 63/1425* (2013.01); *G06F 17/30663* (2013.01); *G06F 17/30705* (2013.01); *H04L 51/32* (2013.01)

(58) Field of Classification Search
CPC ................ H04L 63/1425; H04L 51/32; G06F 17/30705; G06F 17/30663
See application file for complete search history.

(56) References Cited

U.S. PATENT DOCUMENTS

| | | | | |
|---|---|---|---|---|
| 2007/0028297 | A1* | 2/2007 | Troyansky | H04L 63/1408 726/2 |
| 2015/0381628 | A1* | 12/2015 | Steinberg | H04L 63/10 726/4 |
| 2016/0328467 | A1* | 11/2016 | Zou | G06F 17/2735 |
| 2017/0019364 | A1* | 1/2017 | Gamaley | G06F 21/6245 |

OTHER PUBLICATIONS

Gross, et al., "Information revelation and privacy in online social networks", Proceedings of the 2005 ACM workshop on Privacy in the electronic society, 2005, 11 pages.
Molok, et al., "Understanding the factors of information leakage through online social networking to safeguard organizational information", Proceedings: 21st Australasian Conference on Information Systems, 2010, 12 pages.

* cited by examiner

Primary Examiner — Jeffrey D. Popham
(74) Attorney, Agent, or Firm — Wolfe-SBMC

(57) ABSTRACT

This document describes apparatuses and techniques for monitoring social media for breach of organizational privacy. In some aspects, these techniques receive social media content from a social media site or social media stream. The social media content is compared with organizational information that includes private information and public information to determine an amount of private data disclosed by the social media content. Based on a ratio of amounts of the private data and public data disclosed, a score is provided that indicates a degree to which the social media content breaches organizational privacy.

20 Claims, 8 Drawing Sheets

MONITORING SOCIAL MEDIA FOR BREACH OF ORGANIZATIONAL PRIVACY

BACKGROUND

For many people, social media has become an integral part of their day-to-day lives. Users of social media often post parts of their daily lives to a variety of social platforms, such as social networks, microblogs, media sharing sites, collaboration sites, and the like. While most of these posts pertain to pedestrian aspects of the users' lives, sometimes users unknowingly post information that is confidential to an organization for which they work. In just the past few years, there have been several cases in which privacy of an organization has been compromised by either an employee or third party posting confidential or private information.

To prevent these breaches in privacy, many organizations implement preemptive measures, such as non-disclosure agreements (NDAs) or security education training and awareness (SETA) for employees. Most privacy breaches, however, are not intentional, but the result of human error on the part of an employee or a third party with access to private information. As such, some privacy breaches occur because no amount of training and education can address human error on the part of every employee or third party with private information. Further, due to the sheer volume of social media content generated on a daily basis, many breaches go undetected by an organization until the private information goes viral and is widely distributed across social media sites.

SUMMARY

This document describes apparatuses and techniques for monitoring social media for breach of organizational privacy. These apparatuses and techniques are capable of monitoring streams of social media for breaches of organizational privacy. In some aspects, social media content is compared to organizational data that includes private data and public data to determine an amount of private data disclosed by the social media content. Based on the amount of private data disclosed, a score is provided that indicates a degree to which the social media content breaches organizational privacy. In contrast to current preemptive techniques, the techniques described herein allow an organization to detect critical or private information leaked into social streams and quickly mitigate possible damage caused by the release of the information. Further, some aspects enable the testing of "privacy-ness" of potential social media content before the content is posted into a social media stream. By so doing, inadvertent leaks of private information into the social stream can be averted, thereby preventing leaked information from going viral across the social stream.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Figure 1:
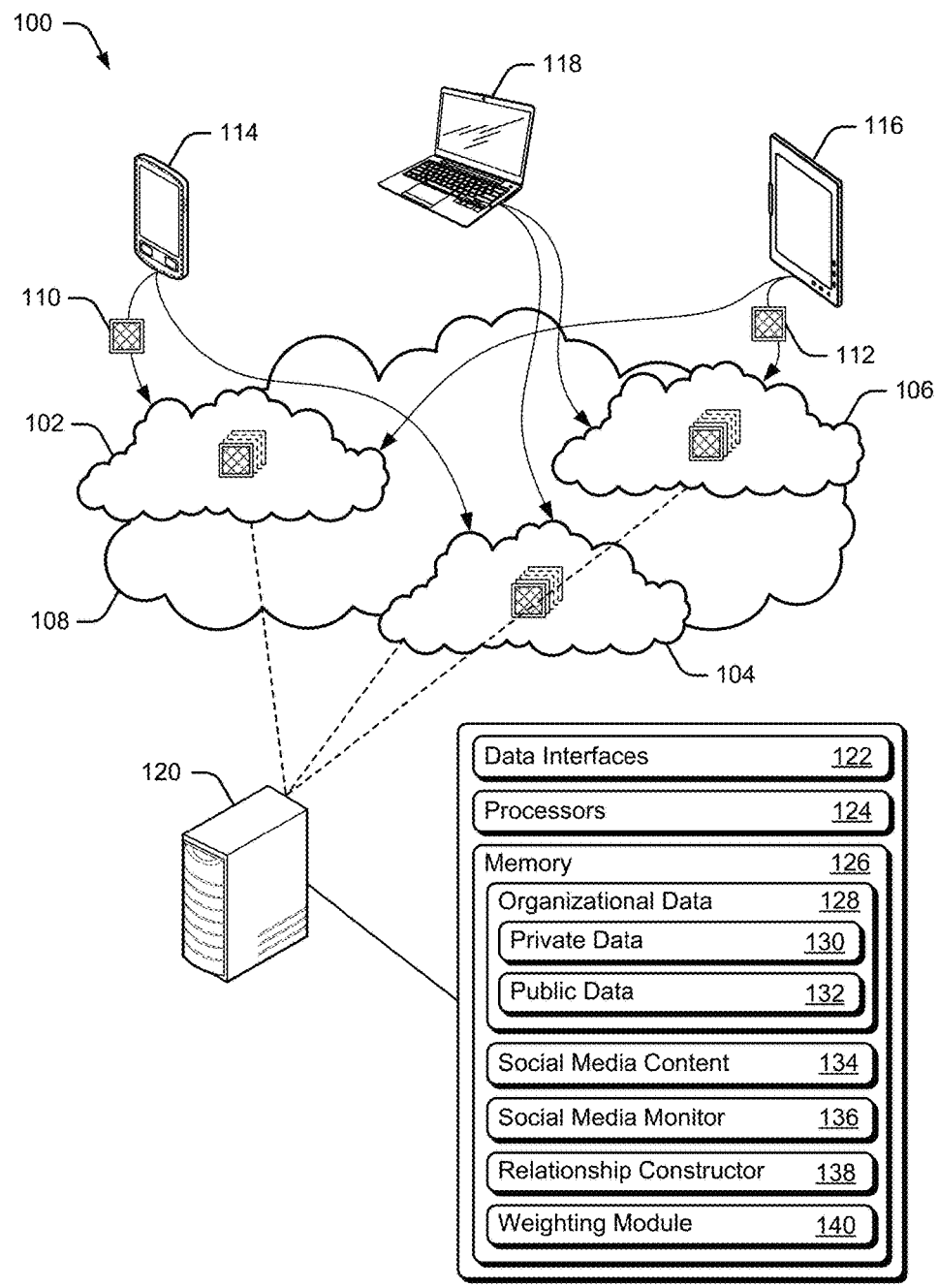
FIG. 1 illustrates an operating environment having social media sites and a computing device on which a social media monitor is implemented.

Conventional techniques for addressing organizational privacy often involve employee education or training that is intended to prevent breaches of an organization's privacy. No amount of education or training, however, can eliminate simple human error or inattention on the part of every employee of an organization. As such, the conventional techniques have failed to prevent numerous privacy breaches over the years, particularly recent breaches made through social media. Although seemingly innocuous, social media is easily accessible and far reaching, making these breaches particularly damaging when private information goes viral.

Apparatuses and techniques are described for monitoring social media for breach of organizational privacy, which can determine whether social media content breaches privacy of an organization. The apparatuses and techniques can be implemented to, or provide services that, enable an organization to view critical or private information on social media sites and reduce potential damage caused by the dissemination of such information.

In various aspects set forth below, the techniques receive social media content from a social media site, social stream, or social media screening application. The social media content is then compared with organizational data that includes private data and public data. Based on this comparison, a score is provided that indicates a degree to which the social media content breaches organizational privacy. In some of these aspects, the techniques weight the private data and public data of the organization prior to performing the comparison. The weighting may include categorizing respective terms of the private data and public data and constructing relationships (e.g., semantic graphs) for the respective terms. The relationships of the respective terms of the private data and public data can then be weighted based on importance, frequency, or other linguistic characteristics. Alternately or additionally, the private data or public data can be weighted by anonymously querying the relationships of the terms within a respective data set (e.g., edge weighting).

In the following, social media refers to user generated or manipulated content that is shared publicly via a social media platform, such as a social network, web-blog, or media sharing site. Organizational data refers to data of an organization, which includes private data and public data of the organization. The private data of the organization refers to protected information (e.g., confidential or sensitive material) that is not released by the organization to the general public. Public data, on the other hand, refers to information made accessible to the public by the organization or a user. Further, organizational privacy refers to an ability to prevent private data of the organization from being disclosed to the public. Accordingly, a breach in organizational security refers to a disclosure, unintentional or otherwise, of an organization's private data into the public domain by an employee or other user.

The discussion now turns to an operating environment, techniques that may be employed in the operating environment, and a system in which components of the operating environment can be embodied. In the discussion below, reference is made to the operating environment by way of example only.

Operating Environment

FIG. 1 illustrates an operating environment 100 in a digital medium environment that includes social media sites 102 through 106, each of which is accessible through the Internet 108 or other networks. The social media sites 102 through 106 may be configured as any suitable type of site, such as a social network, web-log (blog), microblog, media (e.g., photo, image, or video) sharing site, collaborative site, wiki site, and the like. The social media sites 102 through 106 store and distribute social media content, such as social media post 110 and social media post 112 that are posted by users of personal device 114 and personal device 116, respectively. Although just two social media posts are shown for visual brevity, the social media sites 102 through 106 may receive social media posts from any or all of the personal devices 114 through 118 (as indicated by arrows in FIG. 1). In some aspects, one or more users of the personal devices 114 through 118 are employees of a company or organization.

The operating environment 100 also includes a computing device 120 having data interfaces 122, which enable communication with the social media sites 102 through 106 via the Internet 108 or other intermediate networks. In some cases, the data interfaces 122 are wired data interfaces, such as Ethernet or fiber optic network adapters. In other cases, the data interfaces 122 include wireless interfaces, such as modems configured to communicate over a wireless local-area-network (WLAN) or wireless wide-area-network (WWAN).

The computing device 120 also includes processors 124 and a computer-readable storage memory ("memory") 126. The memory 126 may include any suitable type of memory media or devices, such as volatile memory, non-volatile memory, random-access memory, storage drives (e.g., optical or magnetic), and the like. For the purpose of this disclosure, the memory 126 stores information or data of the computing device 120, and thus does not include carrier waves or transitory signals.

In this particular example, the memory 126 includes organization data 128 of a particular organization (or company). The organization data 128 comprises private data 130 and public data 132 of the organization. In some cases, the private data 130 and public data 132 are stored in separate repositories or directories, which can enable the respective data to be identified as either private or public. The private data 130 may include any suitable type of files or information, such as confidential documents, product information, trade secrets, customer contracts, unreleased marketing material, secure directories, internal email, product roadmaps, licensing information, authentication algorithms, encryption keys, and the like. In other words, the private data 130 is data or information of the organization that is not exposed or available to the general public or competitors.

The public data 132 includes publicly exposed data or information of the organization, such as published marketing material, released product roadmaps, press releases, support forums, product manuals, external blogs, webpages, and so on. The public data 132 differs from the private data 130 in that the public data 132 has been exposed or released by the organization to the public. As such, the private data 130 and public data 132 can be considered separate or mutually exclusive sets of information with few or no common items.

The memory 126 also includes social media content 134, which can be received from social media sites 102 through 106 or a social media screening application. The social media content 134 may include text-based content, such as microblog posts (e.g., Tweets), social network posts or comments, universal resource locators (URLs), condensed URLs, tagging prefixes or suffixes (e.g., hashtags), usernames, aliases, email addresses, phone numbers, coordinates, timestamps, and the like. Alternately or additionally, the social media content 134 may include audio, video, images, photos, screen captures, icons, emoticons, or any suitable combination thereof.

The computing device 120 also includes social media monitor 136, relationship constructor 138, and weighting module 140, which are embodied on memory 126. In some aspects, the social media monitor 136 accesses the social media content 134 and compares the social media content with the organizational data 128. Based on the comparison, the social media monitor 136 can determine a score that indicates whether the social media content breaches organizational privacy. The social media monitor 136 may also interact with relationship constructor 138 to pre-process, extract, and construct relationships for language or terms of the private data 130 and public data 132. The weighting module 140 can quantify the relationships or dependencies of the terms based on a variety of factors, such as importance, frequency, linguistic characteristics, or manually chosen or selected dependencies. How the social media monitor 136, relationship constructor 138, and weighting module 140 are implemented and used varies, and is described below.

Figure 2:
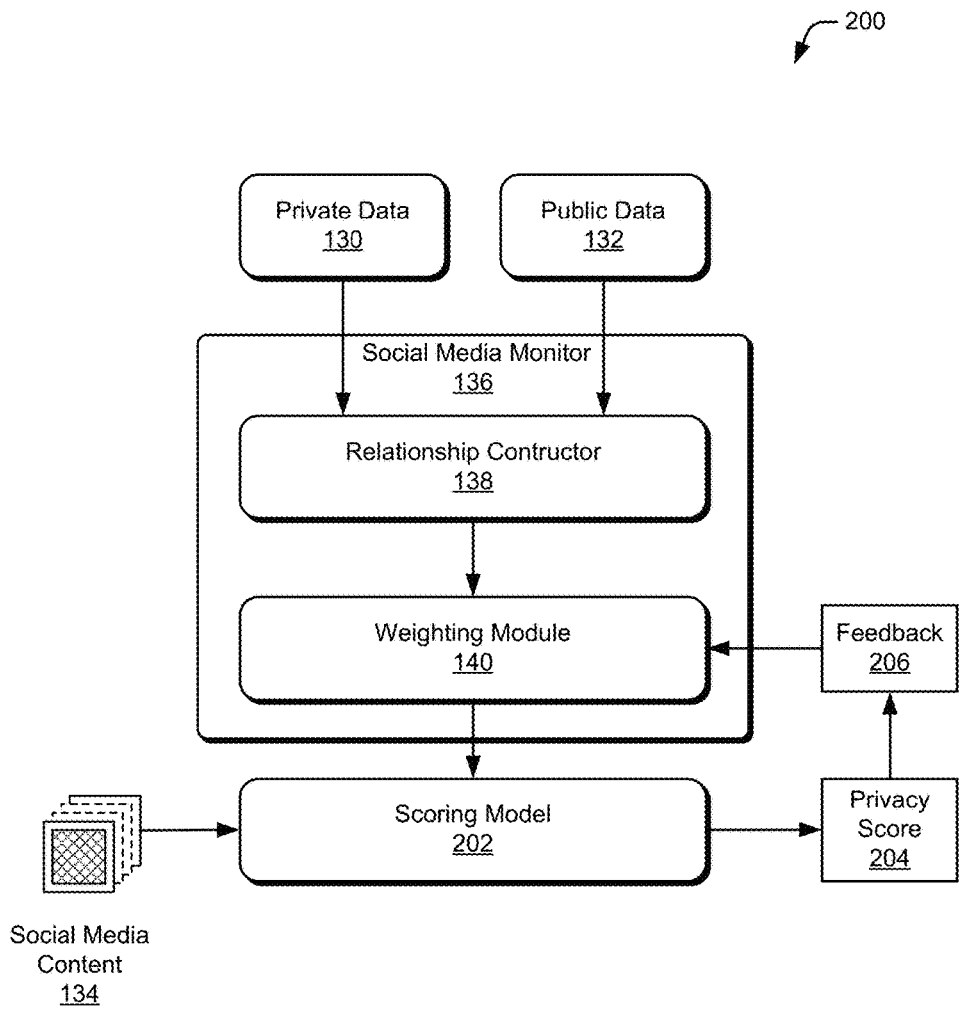
FIG. 2 illustrates an example framework for implementing the social media monitor and other elements of FIG. 1.

FIG. 2 illustrates an example framework 200 for implementing the social media monitor 136 and other elements of FIG. 1. The framework 200 may be implemented in whole or part by a computing device, such as a server of an organization or cloud-based computing resources. For example, the framework 200 can be implemented to provide organizational privacy services to an organization or client that is not co-located with the computing device or resources implementing the framework.

In this example, social media monitor 136 includes the relationship constructor 138 and weighting module 140, which can be implemented as functions or extensions of the social media monitor. The social media monitor 136 has access to the private data 130 and public data 132 of an organization. In some cases, the social media monitor 136 accesses the private data 130 and public data 132 over a private or internal network of the organization. In other cases, the social media monitor 136 accesses the private data 130 and public data 132 remotely, such as by a virtual private network (VPN) into the organization's network.

The relationship constructor 138 organizes and identifies privacy dependent data of the organization. In some cases, the relationship constructor 138 pre-processes the private data 130 and public data 132 by extracting the data from respective repositories of documents and files. For example, the relationship constructor 138 can extract textual data from any suitable file or document, such as tables, hyper-terminal markup language (HTML) pages, extensible markup language (XML) pages, spreadsheets, presentations, databases, calendars, email, and the like. The relationship constructor 138 may also lemmatize the textual data into variant form or resolve the textual information for pronoun references. By so doing, terms and words of the textual data can be identified for further processing. An example of lemmatization and pronoun resolution is shown below in table 1.

TABLE 1

| Adobe is extremely excited to be releasing the newest version of media encoder CC which is accompanied by all its new version of creative video and audio desktop apps. | Adobe is extreme excite to be release the new version of media encoder CC which is accompany by all Adobe new version of creative video and audio desktop apps. |
| --- | --- |

In some aspects, the relationship constructor 138 categorizes words or terms of the textual data into different categories. The different categories may include categories based on company (organization) identifiable information (CII) and other categories based on non-CII information. By way of example, consider table 2, which describes six categories for CII entities and six categories for non-CII entities.

TABLE 2

CII Entity Categories:

Employees: Employees' names or aliases from internal repositories.
Product: Products mentioned in blogs and internal sites.
Places: Company office addresses and locations.
URLs: Company URLs that are private and public.
IP: Internal and Public IP address of the organization.
Phone Number: Phone numbers of company.
Non-CII Entity Categories:

Marketing Terms: Marketing language of a product or company.
Technical Terms: Technical description of product details.
English Words: Normal English language terms.
Alphanumeric: Words of alphabetic, numeric, and special symbols.
Date: NLP detected date mentions or time intervals.
Customer: Customer names obtained from internal repositories.

Based on the words and categories, the relationship constructor 138 builds structures that represent relationships between the terms of textual data. In some cases, the relationship constructor 138 creates these relationships using natural language processing (NLP) to parse pairs of the terms. In other cases, the relationship constructor 138 forces dependencies between pairs of terms based on manual input, such as pairs of terms that are likely to appear private or confidential material. The relationships may be represented using any suitable structure, such as a semantic network or semantic graph.

The weighting module 140 weights or quantifies the private and public relationships constructed by the relationship constructor 138. The weighting module 140 may weight patterns of relationships of terms that are indicative of the relationships being more-private or more-public. In some cases, the weighting module 140 receives the relationships of the private data and the public data as respective semantic graphs. In such cases, the relations can be weighted such that edges between nodes of similar categories are weighted similarly. For example, if an edge a product term (e.g., product name) to a date term (e.g., release date) is observed to be strong in the private data 130, the weight is increased in edges between the product term and date term. Alternately or additionally, the edges of semantic graphs can be weighted by performing queries in which terms or categories are randomized.

In some aspects, respective relationships are weighted for the private data 130 and the public data 132. This can be effective to "train" a separate set of relationships or semantic graphs for the private data 130 or the public data 132. Further, for each document in a given repository, the relationship constructor 138 and weighting module 140 can generate a document-specific weighted graph by which to gauge privacy. Although extracted from separate repositories, there may be some relationship of term overlap between respective semantic graphs for the private data 130 and the public data 132.

A scoring model 202 of the framework 200 is implemented using the quantified or weighted relationships provided by the weighting module 140. Alternately or additionally, the scoring model can be implemented using weighted terms of the private data 130 and public data 132. The scoring model 202 provides a basis for measuring or quantifying privacy-ness of the social media content 134. In the context of organizational privacy, privacy-ness may range from low (e.g., public or innocuous content) to high (e.g., confidential content) or a degree to which the social media content 134 breaches organizational security. The social media content 134 can be compared, analyzed, or queried based on the scoring model 202 to provide a privacy score 204 for that instance of social media content.

The privacy score 204 indicates a privacy-ness or degree to which the social media content 134 breaches organizational security. The privacy score 204 may be provided in any suitable format, such as a notification or message that includes textual information of the social media content, a URL of the social media site from which the social media content was retrieved, and contact information for an administrator or point-of-contact for the social media site to facilitate removal of the social media content. Alternately or additionally, the privacy score 204 can be compiled as feedback 206 for the weighting module 140. In at least some aspects, the weightings of the semantic graphs for the private data 130 and public data 132 can be updated based on privacy patterns in the feedback 206.

Techniques for Monitoring Social Media for Breach of Organizational Privacy

As noted above, the techniques enable an organization to monitor social media and determine a degree to which social media content breaches privacy of an organization. The following methods are described in part using entities and examples of FIGS. 1 and 2, though this is for example only. Methods described herein can be performed by one or multiple entities, and be combined, in whole or in part. The methods are depicted as a set of operations, any of which may be omitted, repeated, or combined with operations of another method to implement alternate methods. The order shown for operations performed is for example only, and is not intended to limit the techniques described herein.

Figure 3:
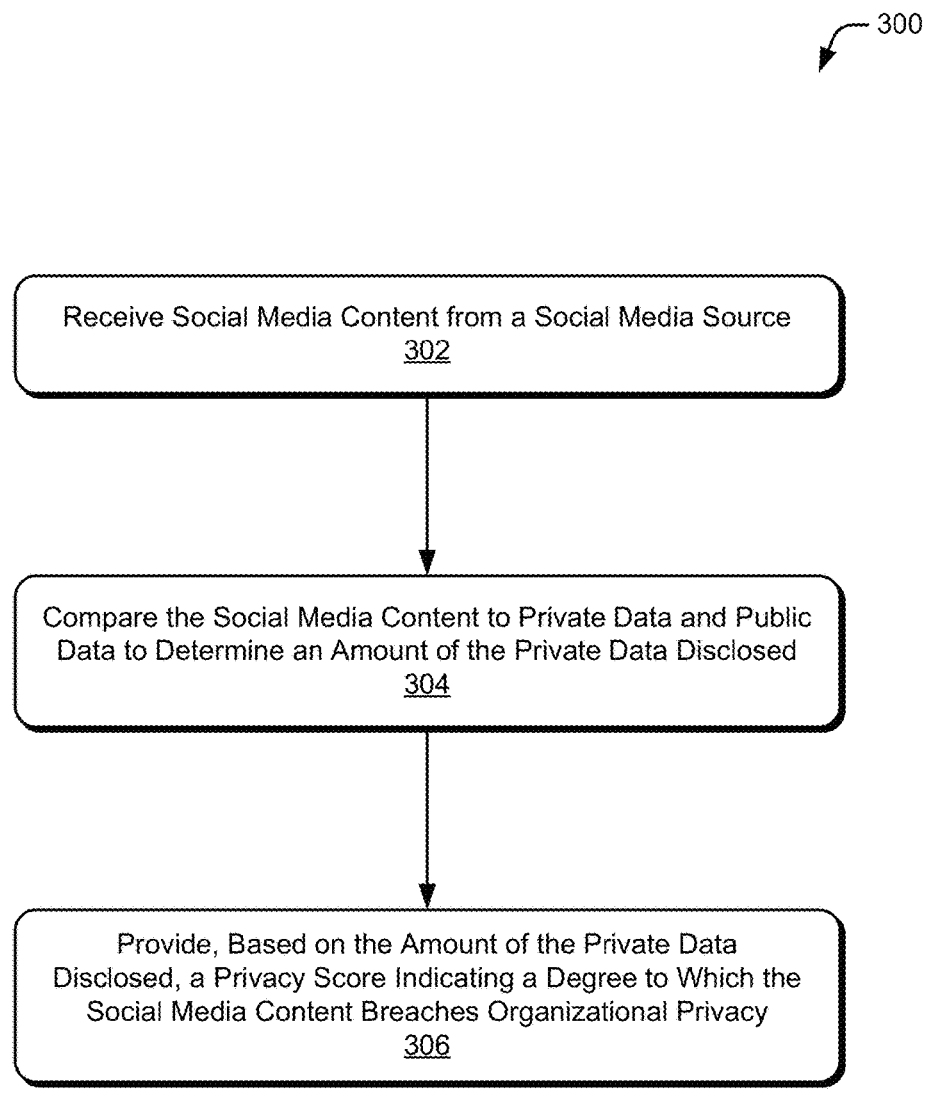
FIG. 3 illustrates an example method for providing a score that indicates a degree to which social media breaches organizational privacy.

FIG. 3 illustrates an example method 300 for providing a score that indicates a degree to which social media content breaches organizational privacy, including operations performed by the social media monitor 136 of FIG. 1.

At 302, social media content is received from a source of social media. The source of the social media can include a social media site, social stream (e.g., microblog feed), or a social media screening application. For example, the social media monitor 136 can receive potential social media posts from a screening application before the potential social media content is posted to a social media site. In other cases, the social media monitor 136 is configured to monitor social media streams and sites for social media content.

At 304, the social media content is compared to private data and public data of an organization to determine an amount of the private data disclosed by the social media content. The private data and public data may comprise respective textual information extracted from private and public repositories of the organization. In some cases, the private data includes words or terms that are confidential, such as unreleased product names, specifications, release dates, licensing information, and the like.

The comparison may be performed using any suitable algorithm, such as natural language processing, named entity recognition, term matching, semantic graph queries, or stemming. Comparing terms of the social media content to respective terms of the private data and public data can determine a privacy-ness of the social media content. Alternately or additionally, respective terms within the private data and public data can be weighted to provide a scoring model for determining the privacy-ness of the social media content.

At 306, a privacy score is provided based on the amount of private data disclosed by the social media content. The privacy score indicates a degree to which the social media content breaches organizational privacy. In some cases, the score is a ratio of the amount of private data disclosed by the social media content to an amount of total or combined data of the social media content. For example, the ratio may be the amount of private data disclosed divided by a combined amount of the private data and public data disclosed by the social media content. As such, a social media post that included several confidential terms would score as a severe breach in organization privacy. Alternately, a social media post with one confidential term may score as a potential breach or non-breach of organizational privacy.

Figure 4:
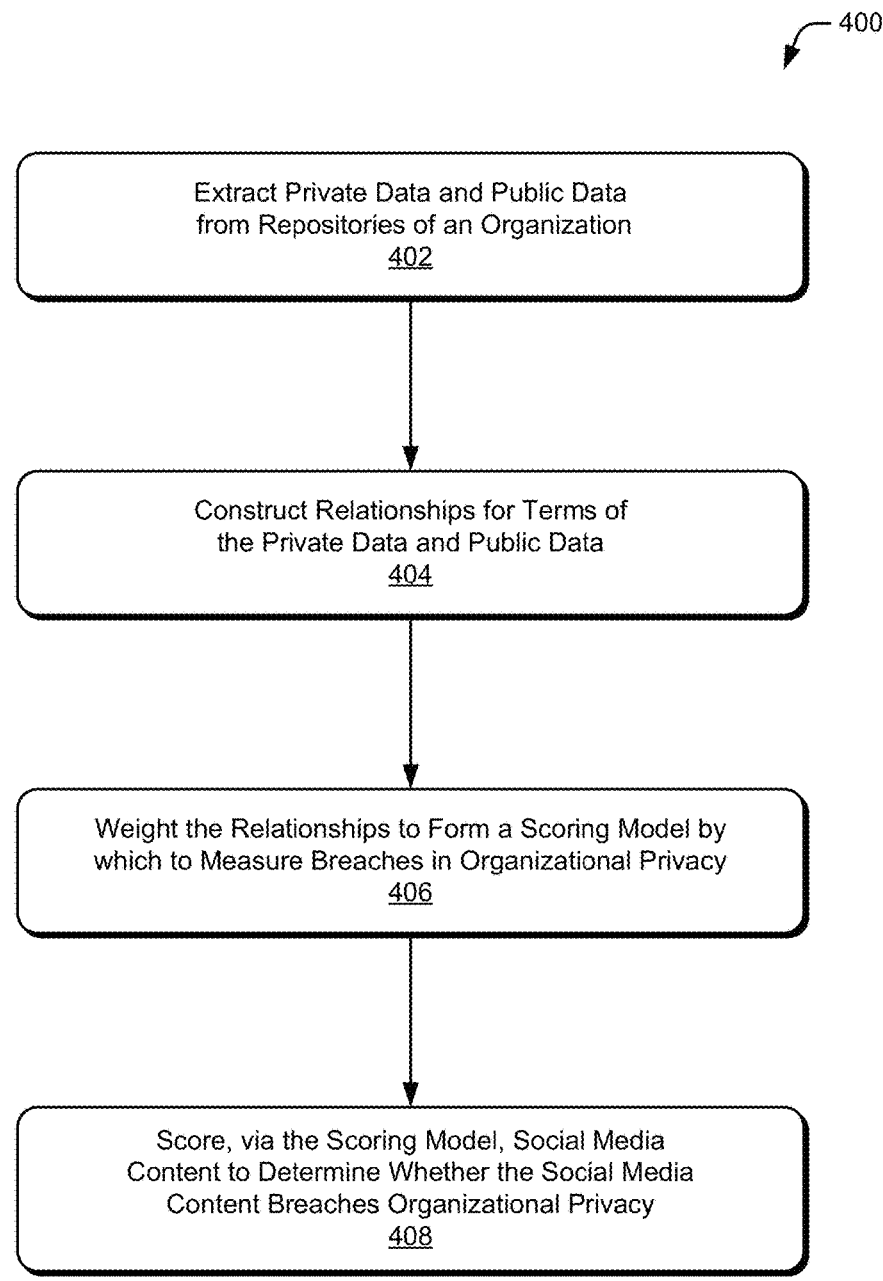
FIG. 4 illustrates an example method for scoring social media to determine whether the social media breaches organizational privacy.

FIG. 4 illustrates an example method 400 for scoring social media to determine whether the social media breaches organizational privacy, including operations performed by the social media monitor 136, relationship constructor 138, and weighting module 140 of FIG. 1.

At 402, private data and public data are extracted from respective repositories of an organization. In some cases, the data is defined by the repository from which the data is extracted. For example, data extracted from an internal design or marketing directory can be defined as private data of the organization. Alternately, data extracted from external blogs, support sites, and public pages can be defined as public data of the organization.

At 404, relationships for terms of the private data and public data are constructed. Constructing the relationships may include extracting and categorizing terms (or words) of the private and public data. In some cases, URL's, IP addresses, phone numbers or dates are extracted based on regular expressions. Further, employee information, product data, places, locations, or customer information can be extracted from the private data using look up tables. When a term is not identified in association with a category, the term can be classified using a standard NLP classifying algorithm.

Using the categorized terms, respective relationships for the private data and public data are constructed as semantic graphs. These relationships may include two types of relationships, NLP-based relationships and manual relationships. The NLP-based relationships may include entity graphs created with a standard parser in which edges of a parsed tree represent relationships between two terms. In some cases, stop words are removed from the data, which may have little or no effect on graph connectivity.

Manual relationships may include forced dependencies between two entities based on user input. Some example entity pairs include "Employees and Product," "Customer and Product," "Product and Technical Terms," "Dates and Products," "Employees and phones," or "Phone and Places". These dependencies may be important for detecting a breach in privacy even though a NLP dependency may not exist between the two entities.

At 406, the relationships of the terms are weighted to provide a scoring model by which to measure breaches in organizational privacy. Patterns in the relationships that are indicative of private or public information can be weighted more heavily than others. For semantic graphs, the relationships may be weighted such that edges between nodes of similar categories are weighed similarly. For example, if an edge from a product "media editor" to "release date" is observed to be strong in the private data, a weighting is increased at edges between the "product" and "release date" in the public data.

At 408, social media content is scored using the scoring model to determine whether the social media content breaches organizational privacy. Scoring the social media content may include comparing terms of the social media content to the weighted relationships of the scoring model. In some cases, a semantic graph is constructed for the social media content and queried against respective semantic models of the private data and public data. In such cases, the score can be a ratio of relationship strength between the social media and private data semantic graphs and relationship strength between the social media and public data semantic graphs.

Based on the score, a determination as to whether the social media content breaches organizational security is made. In some cases, the score is compared to a predefined privacy threshold to determine if the social media content constitutes a privacy breach. In such cases, a notification can be sent to the organization in response to determining that the social media content breaches the privacy of the organization. By so doing, the organization can take proactive measures to remove the content from the social media stream, thereby mitigating any potential harm caused by continued dissemination of the content.

Figure 5:
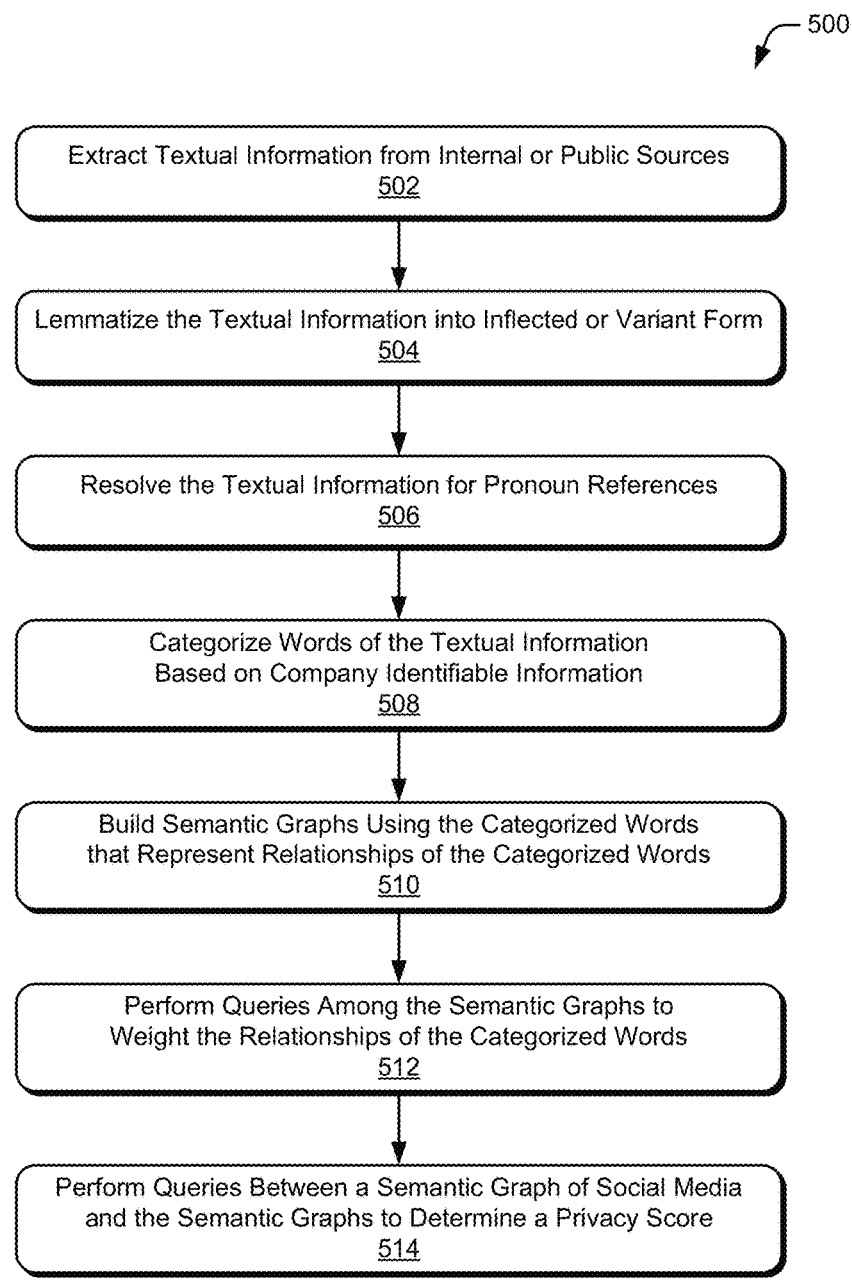
FIG. 5 illustrates an example method for building and querying semantic graphs to determine privacy scores in accordance with one or more aspects.

FIG. 5 illustrates an example method 500 for building and querying semantic graphs to determine privacy scores, including operations performed by the social media monitor 136, relationship constructor 138, and weighting module 140 of FIG. 1.

At 502, textual information is extracted from private and public repositories of an organization. The textual information may be extracted from any suitable type of files, such as HTML pages, XML pages, spreadsheets, presentations, databases, calendars, images, photographs, or email. In some cases, the textual information is extracted from the files as metadata, which may include watermarks, document change tracking, global positioning system (GPS) coordinates, and so on.

At 504, the textual information is lemmatized into inflected or variant form. Lemmatizing the textual information can be effective to increase an efficacy of subsequent NLP or other semantic-based operations that receive the lemmatized textual information.

At 506, the textual information is resolved for pronoun references. Similar to the lemmatization, resolving the textual information may also increase an efficacy of subsequent NLP or other semantic-based operations that receive the pronoun-resolved textual information.

At 508, words of the textual information are categorized based on company identifiable information. In some cases, the textual information is categorized into categories defined by the company identifiable information and other categories defined by non-company-specific information. The categories based on the company identifiable information may include employees, products, places, URLs, IP addresses, or phone numbers. Alternately, the non-company-specific categories can include marketing terms, technical terms, English terms, alphanumeric terms, dates, and customers.

At 510, semantic graphs are built that represent relationships of the categorized words. These semantic graphs may represent two types of relationships, NLP-based relationships and manual relationships. The NLP-based semantic graphs may include entity graphs created with a standard parser in which edges (e.g., terms or categories) of a parsed tree represent relationships between two terms. The semantic graphs that represent the manual relationships may include forced dependencies between two edges based on user input. These dependencies may be important for detecting a breach in privacy even though a NLP dependency may not exist between the two edges.

At 512, queries are performed among the semantic graphs to weight the relationships of the categorized words. For example, semantic graphs of the private data can be queried to train or provide a weighted semantic graph that represents the private data of the organization. Similarly, semantic graphs of the public data can be queried to train or provide a weighted semantic graph that represents the public data of the organization.

In some cases, relationship importance of a semantic graph is specified between particular categories to reflect likely connection to private or confidential data. For example, the importance can specified based on terms or categories found in confidential documents, such as NDAs or trade secret documents. As such, $I_k$ can be chosen as a Relationship Importance Factor between all pairs of categories. The queries used to provide the weighted semantic graphs be implemented using any suitable algorithm, such as anonymized queries in which terms or categories are anonymized for a given semantic graph.

By way of example, consider equation 1, which can be implemented to perform two-node anonymized queries for weighting edges of semantic graphs.

$$W(E_k)=W(E_k)+I_k, \forall E_k \in S: I_k = \text{Importance}(E_k) \quad \text{Equation 1.}$$

Figure 6:
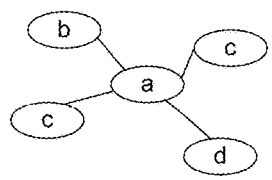
FIG. 6 illustrates example semantic graphs provided by the operations described with reference to FIG. 5.
Figure 6:
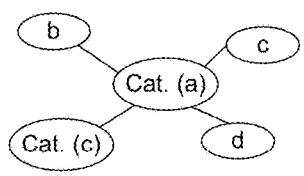
Figure 6:
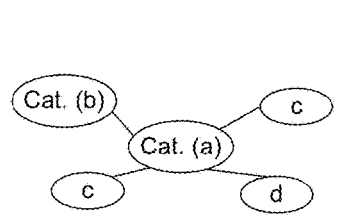
Figure 6:
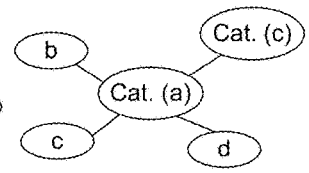
Figure 6:
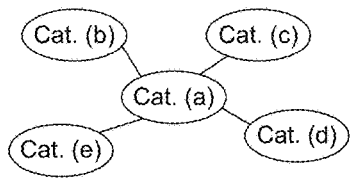
Figure 6:
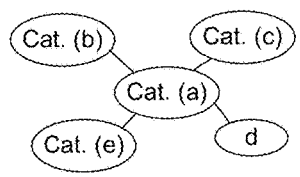
Figure 6:
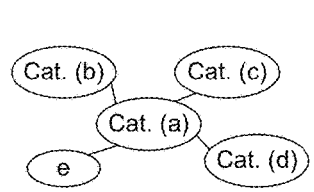
Figure 6:
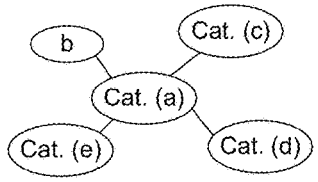

For every edge E, a weight W is determined by replacing values in nodes of the edge by their categories (anonymization) and querying an organization-wide graph for this smaller semantic subgraph. For the query solution set S (comprising all the edges that result from querying over the graph), the weight at a given edge is increased using equation 1. An example implementation of a query is depicted in FIG. 6, which includes an example query 600 for a training graph 602. The training graph 602 represents a training sentence having terms of "a", "b", "c", "c", and "d". For each of the queries, which include query 1 604, query 2 606, and query 3 608, an entity is replaced by its respective category (e.g., "a" replaced with "category a").

When implemented as an algorithm or program, the edge weighting may be performed using the operations shown in Table 3.

TABLE 3

Algorithm: 2-Node Anonymization
Require: G - Semantic Graph, Data Repository to Train 1: For each e in Edges(G):
2:   Q = EdgeReplace(e,G) // replace e nodes with its type in graph
3:   S = Query(Q) // result of query in S.
4:   For each e in S:
5:     W(e) = W(e) + Importance(e)

Multiple-category anonymization is another algorithm that can be used to weight the relationships of the categorized words or semantic graphs. This approach can be implemented by iterating through all node categories and for each category C and querying edges of an organization-wide semantic graph (e.g., private data or public data semantic graph). In some cases, all edges of the organization-wide semantic graph that have C as the category of a node are queried. The anonymization percentage of the category is then computed, or defined as Anonymization Percentage, for a category in the semantic graph as shown in equation 2.

$$AP(C) = \frac{N \in C}{N_t}, C \in CAT(G) \text{ and} \quad \text{Equation 2}$$

$N_t$ = total nodes in graph

If Node Removal AP(C) exceeds a particular threshold σ, which may be determined empirically, this indicates that the category C is widely present in the semantic graph. For all categories for which AP(C)>σ, nodes N in the document-specific semantic graph are replaced with their respective categories to anonymize the nodes. Actual values of the nodes can then be substituted one-by-one to update the edge weights of all the resulting edges as shown in equation 3.

$$W(E_k,N)=W(E_k,N)+\Sigma_S I_k *f_t, \forall E_k \in S:I_k=\text{Importance}(E_k),$$
$$f_t=|S(N)| \quad \text{Equation 3}$$

An example query 610 illustrates the implementation of equation 3 for a training graph 612, which includes categories "a", "b", "c", "d", and "e". In the context of equation 3, where N is the node whose category was substituted with a value, the categories substituted include category "d" in query 1 614, category "e" in query 616, and category "b" in query 618.

When implemented as an algorithm or program, the multiple-category anonymization may be performed using the operations shown in table 4.

TABLE 4

Algorithm: Multiple-Category Anonymization
Require: G - Semantic Graph, Data Repository to Train 1: For each t in Type(G):
2:   If (AP (t) > 30 %):
3:     Q = NodeAddition (t, typeGraph(G)) // replaces all type t nodes to values
4:     S = Query (Q) // Queries Q over graph.
5:     For each e as pair<a,b> in S:
6:       If ( a ∈ G and b ∉ G) :
7:         F[a] = F[a]+1
8:         Set[a].add(b)
9:       If( b ∈ G and a ∉ G ) :
10:        F[b] = F[b]+1

TABLE 4-continued

Algorithm; Multiple-Category Anonymization
Require: G - Semantic Graph, Data Repository to Train 11:     Set[b].add(a)
12:     For each index I in Set:
13:         For each element e in Set[i]:
14:             W(Edge(I,e)) = W(Edge(I,e)) + Importance(Edge(I,e))
                *Set[i].size( )

In some aspects, performing the anonymized queries for the respective semantic graphs of the private data and public data provides two weighted semantic graphs by which to measure a breach in privacy. These weighted semantic graphs are weighted based on the textual information extracted from their associated respective repository.

At 514, queries are performed between a semantic graph of social media content the semantic graphs of the organizational data to determine a privacy score. For example, when a social media post is received, the content of the post is scored by using the semantic graphs provided by operation 512. To do so, a semantic graph for the terms of the social media post is constructed, which may include performing operations 502 through 510 for the content of the social media post. Edges of the post's semantic tree are then queried from both weighted graphs provided by operation 512 for the private data and public data. These queries may result in one of three outcomes, which are described in relation to equations 4 and 5 as follows.

$$w = \frac{\sum_{k=1}^{Paths} \sum_{j=1}^{Li} w(e_j) * a^{-j}}{|Paths|} \quad \text{Equation 4}$$

When both nodes are present in a semantic graph and there is at least a path between two nodes within λ hops, a weight of an edge for the social media post is estimated as shown in equation 4. Here, $e_j$ is the $j^{th}$ edge in the path, $w(e_j)$ is the weight of the edge, and a is a decay factor.

$$w = \frac{\sum_{j}^{N_e(Node)} w(e_{R_j})}{|N_e(Node)|} \quad \text{Equation 5}$$

When only one nodes exists in the semantic graph, edge weight is estimated as shown in equation 5. Here, Ne (Node) contains all neighboring nodes that have a same type or category as the other node that was not found. When neither of the nodes exist in the semantic graph, then the weight is estimated as zero.

After calculating weights for the social media post's sematic graph against the private and public data, an average weight of the edge in post's semantic graph is calculated as shown in equation 6.

$$Score = \frac{\sum_{j}^{Edges(Post)} w(e_{R_j})}{|Edges(Post)|} \quad \text{Equation 6}$$

This score is calculated for both types of organizational data, the private data and public data. Based on these scores, a privacy score for the social media post can be calculated using equation 7.

$$Score_{Privacy} = \frac{Score_{Internal}}{Score_{Public} + Score_{Internal}} * 10 \quad \text{Equation 7}$$

This privacy score is bounded between zero and ten, with 10 indicating highly sensitive social media content, and thus a severe breach in organizational privacy. Alternately, a score of zero indicates harmless social media content and that the content does not breach of organizational privacy. Once determined, the privacy score can be sent as part of a report that includes textual information of the social media content, a URL of the social media site from which the social media content was retrieved, and contact information for an administrator of the social media site to facilitate removal of the social media content from the site.

Figure 7:
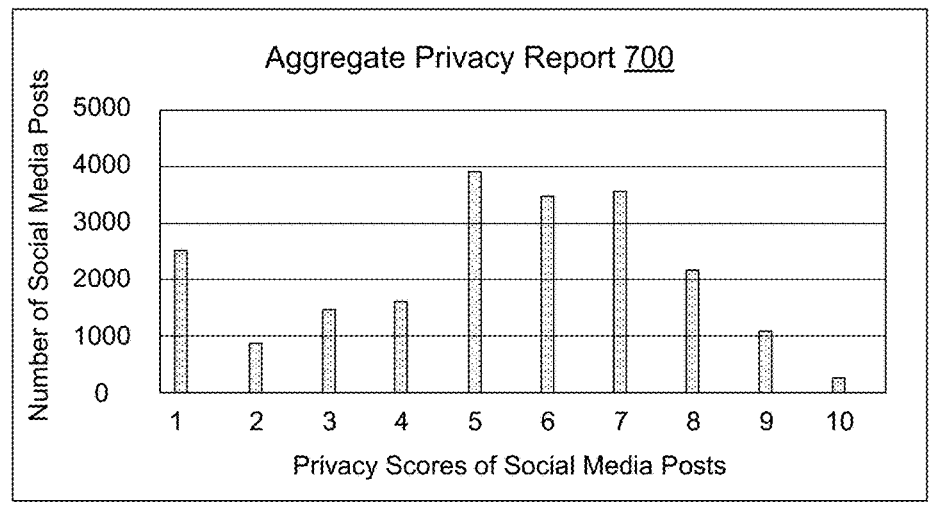
FIG. 7 illustrates an aggregate privacy report for a set of social media posts that are scored in accordance with one or more aspects.

By way of example, consider FIG. 7, which shows an aggregate privacy report 700. The aggregate privacy report 700 illustrates a compilation of privacy scores for 20,000 random social media posts related to a company's products. In addition to the social media posts, 1,116 sentences from an internal source, which were not used for semantic graph construction and edge weighing, were added to the test set. Degrees of privacy breach can be separated into three categories of scores: innocuous (0-4), mildly private (4-7), and confidential (8-10). As indicated by the aggregate privacy report 700, of the 21,116 content samples, about 31% were classified as innocuous, about 52% were classified as mildly private, and the remaining approximate 17% were categorized as confidential. Such a report, provided by an automated service, enables an organization to easily identify social media content that breaches organizational privacy. Alternately or additionally, a supplemental report may include detailed information of the highest scoring social media content, such as information identifying the social media site hosting the confidential content or the employee responsible for posting the confidential content.

Example System and Device

Figure 8:
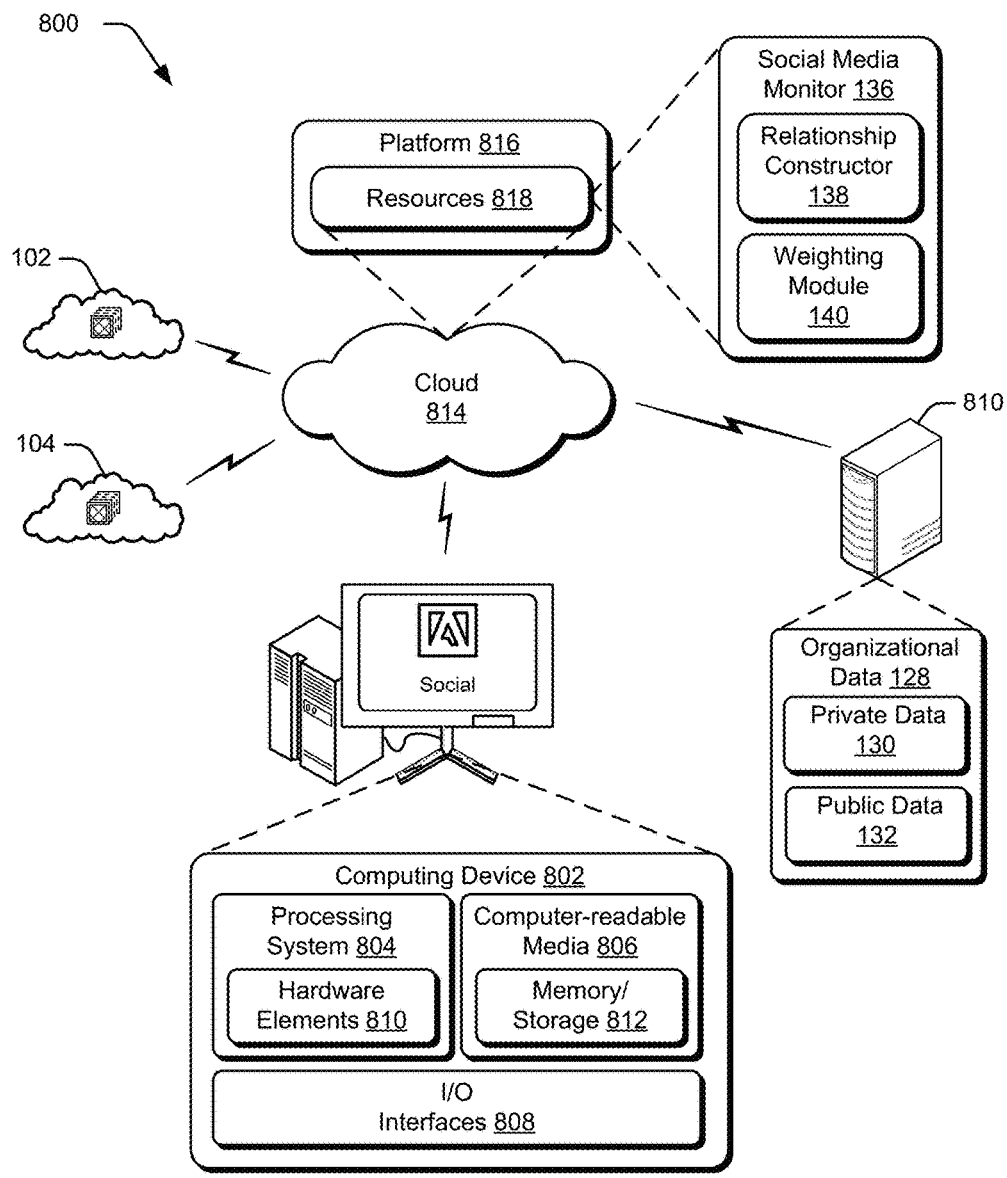
FIG. 8 illustrates an example system for implementing aspects of the techniques described herein.

FIG. 8 illustrates an example system generally at 800 that includes another example computing device 802 that is representative of one or more computing systems and/or devices that may implement the various techniques described herein. This is illustrated through inclusion of the social media monitor 136, relationship constructor 138, and weighting module 140. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

In some aspects, the platform 816 can provide a cloud-based service for implementing the techniques descried herein, such as monitoring social media for breach of organizational security. The platform 816 is capable of communicating with the social networks 102 and 104 to receive social media content. The platform 816 may also communicate with a remote server 810 to receive organizational data 128 that includes private data 130 and public data 132 of an organization. By implementing one or more of the techniques, the social media monitor 134 can provide a score that indicates a degree to which the social media content breaches privacy of the organization.

The system 800 can then send the score, either independently or combined with other scores, to a client device (e.g., computing device 802) of the organization or other entity for review or further action. For example, the privacy score can be sent as part of a report that includes textual information of the social media content, a URL of the social media site from which the social media content was retrieved, and contact information for an administrator of the social media site to facilitate removal of the social media content from the site.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control breaches of organization privacy by monitoring social media, a method implemented by at least one computing device, the method comprising:
    constructing, by the at least one computing device, a first semantic graph of private organization information and a second semantic graph of public organizational information;
    identifying, by the at least one computing device, a relationship between terms in the first semantic graph indicative of private textual information;
    weighting, by the at least one computing device, the relationship in both the first and second semantic graphs based on the identifying of the relationship from the first semantic graph;
    receiving, by the at least one computing device, social media content;
    querying, by the at least one computing device, the social media content using the first semantic graph having the weighted relationship to generate a first score indicating an amount of the private organizational data disclosed by the social media content;
    querying, by the at least one computing device, the social media content using the second semantic graph having the weighted relationship to generate a second score indicating an amount of the public organizational data disclosed by the social media content; and
    generating, by the at least one computing device based on a ratio of the first and second scores, a privacy score that indicates a degree to which the social media content breaches privacy of the organization.

2. The method of claim 1, wherein identifying of the relationship includes natural language processing (NLP) to parse pairs of the terms.

3. The method of claim 1, wherein the identifying uses manual input that defines dependencies between at least two of the terms.

4. The method of claim 1, further comprising categorizing the terms of the textual information into at least two categories and wherein the constructing of the first and second semantic graphs is based on the at least two categories.

5. The method of claim 4, wherein one of the at least two categories is based on organization-identifiable information and another of the at least two categories is based on non-organization-identifiable information.

6. The method of claim 1, further providing a notification of the breach in organizational privacy, by the at least one computing device, responsive to the score meeting or exceeding a predefined privacy score threshold.

7. The method of claim 1, wherein the identifying further comprises identifying patterns of relationships of terms that are indicative of an amount that the relationships are private or public.

8. In a digital medium environment to control breaches of organization privacy by monitoring social media, a system comprising:
    a data interface configured to communicate over a network through which the social media is accessible;
    a processor configured to execute processor-executable instructions; and
    a memory comprising processor-executable instructions that, responsive to execution by the processor, implement a social media monitor to perform operations comprising:
        constructing a first semantic graph of private organization information and a second semantic graph of public organizational information;
        identifying a relationship between terms in the first semantic graph indicative of frequency of textual information;
        weighting the relationship in both the first and second semantic graphs based on the identified relationship from the first semantic graph;
        receiving, via the data interface, social media content from a source of social media;

querying the social media content using the first semantic graph having the weighted relationship to generate a first score indicating an amount of the private organizational data disclosed by the social media content;

querying the social media content using the second semantic graph having the weighted relationship to generate second a score indicating an amount of the public organizational data disclosed by the social media content; and generating, based on a ratio of the first and second scores, a privacy score indicating a degree to which the social media content breaches privacy of the organization.

9. The system of claim 8, wherein the operations performed by the social media monitor further comprise extracting, from the social media content, textual information and resolving the textual information to provide the terms of the social media content.

10. The system of claim 8, wherein the identifying uses natural language processing (NLP) to parse the terms.

11. The system of claim 8, wherein the system is located remotely from the organization and the operations performed by the social media monitor further comprise providing, responsive to the score exceeding a predefined threshold, a notification of the breach in organizational privacy to an entity associated with the organization.

12. The system of claim 8, wherein the source of the social media content comprises a social media site, a social media stream, or a social media screening application.

13. The system of claim 8, wherein the identifying is performed using at least two document-specific weighted graphs to determine term overlap.

14. In a digital medium environment to control breaches of organization privacy by monitoring social media, a system comprising:

means for constructing a first semantic graph of private organization information and a second semantic graph of public organizational information;

means for identifying a relationship between similar terms of the private information in the first semantic graph;

means for weighting the relationship in both the first and second semantic graphs based on the identified relationship from the first semantic graph;

means for receiving, via a data interface, social media content from a source of social media outside of an organization;

means for querying the social media content using the first semantic graph having the weighted relationship to generate a first score indicating an amount of the private organizational data disclosed by the social media content;

means for querying the social media content using the second semantic graph having the weighted relationship to generate a second score indicating an amount of the public organizational data disclosed by the social media content; and means for generating, based on a ratio of the first and second scores, a privacy score that indicates a degree to which the social media content breaches privacy of the organization.

15. The system of claim 14, wherein the identifying of the relationship includes uses natural language processing (NLP) to parse the terms.

16. The system of claim 14, wherein the identifying includes means for identifying the relationship between categories between the first and second semantic graphs using manual input that defines dependencies between at least two of the categories.

17. The system of claim 14, further comprising means for categorizing the terms of the textual information into at least two categories and wherein the constructing means constructs the first and second semantic graphs based on the at least two categories.

18. The system of claim 17, wherein one of the at least two categories is based on organization-identifiable information and another of the at least two categories is based on non-organization-identifiable information.

19. The system of claim 14, wherein the identifying means includes means for identifying the relationship between categories between the first and second semantic graphs using a relationship importance factor.

20. The system of claim 14, wherein the identifying means includes means for identifying the relationship between categories between the first and second semantic graphs using a multiple-category anonymization algorithm.

* * * * *